United States Patent [19]

Hennings et al.

[11] Patent Number: 5,759,480

[45] Date of Patent: Jun. 2, 1998

[54] METHOD OF FIRING AND SINTERING A CERAMIC ELECTRONIC COMPONENT

[75] Inventors: Detlev Hennings; Herbert Schreinemacher, both of Aachen, Germany

[73] Assignee: U.S. Philips Corporation, New York, N.Y.

[21] Appl. No.: 567,256

[22] Filed: Dec. 5, 1995

[30] Foreign Application Priority Data

Dec. 6, 1994 [DE] Germany .................. 44 43 365.4

[51] Int. Cl.$^6$ .................. C04B 35/26; C04B 35/462
[52] U.S. Cl. .................. 264/620; 156/89; 264/614; 264/615; 264/617; 264/618; 264/619; 264/669; 264/670
[58] Field of Search ............. 264/63, 61, 614, 264/615, 617, 618, 619, 620, 669, 670; 156/89

[56] References Cited

U.S. PATENT DOCUMENTS

| | | | |
|---|---|---|---|
| 4,234,367 | 11/1980 | Herron et al. | 156/89 |
| 4,504,339 | 3/1985 | Kamehara et al. | 156/89 |
| 4,778,549 | 10/1988 | Cowan et al. | 264/61 |
| 4,994,436 | 2/1991 | Giacobbe | 505/1 |

FOREIGN PATENT DOCUMENTS

| | | |
|---|---|---|
| 0295086A1 | 12/1988 | European Pat. Off. . |
| 07109177 | 4/1995 | Japan . |

OTHER PUBLICATIONS

G. Tomandl et al. "Untersuchung des Haftmechanismus zwischen Metallschicht und Keramik fur Metallisierung von Elktrokeramik, auch im Hinblick auf elektrische Eigenschaften", Ber. Dt. Keram. Ges. 56(1979), No. 11–12, pp. 337–341.

*Primary Examiner*—James Derrington

[57] ABSTRACT

Components whose palladium metal-containing constituent is not subject to delamination and which exhibit very good dielectric properties are obtained by means of a method of manufacturing a ceramic electronic component. The ceramic electronic component is essentially composed of a dielectric oxide ceramic and at least one palladium-containing component, and is obtained by firing and sintering of a green body containing an organic binder with the firing process including a first step in which the binder is removed from the binder-containing green body by means of a water-gas reaction in a water vapor-containing, essentially oxygen-free, atmosphere at temperatures between 20° and 880 ° C., and a second step in which the dielectric oxide ceramic is re-oxidized in an atmosphere having an oxygen content of 10 to 100% by volume at a temperature in the range from 880 ° C. to 900 ° C.

8 Claims, No Drawings

1

METHOD OF FIRING AND SINTERING A CERAMIC ELECTRONIC COMPONENT

FIELD OF INVENTION

The invention relates to a method of manufacturing a ceramic electronic component, which is essentially composed of a dielectric oxide ceramic and at least one palladium-containing component, by firing and sintering of a green body comprising organic binders. The method relates in particular to the manufacture of a component made from a metallized multilayer electroceramic material.

BACKGROUND OF THE INVENTION

To manufacture a ceramic electronic component it is generally required to provide a ceramic body with electrical connections, i.e. contacts or electrodes, which are composed of metallic materials. Thus, to manufacture ceramic electronic components a composite must be prepared which comprises two clearly different materials, i.e. an electroceramic material and an electroconductive metallic component.

An example of this is the manufacture of integrated circuits, in which metallic conductor tracks are provided on $Al_2O_3$ substrates by means of thick-film or thin-film technology. For the manufacture of capacitors, coils, memories, actuators it is likewise necessary that a ceramic material contacts metal layers. Multilayer capacitors, multilayer varistors and multilayer actuators are exceptions to this rule because their manufacture requires the metal electrodes and the ceramic material to be fired and sintered conjointly. This firing and sintering process of multilayer components throws up particular problems.

Multilayer capacitors, multilayer actuators and multilayer varistors are constructed according to the same principle: "green" (non-fired) ceramic substrate foils having a large content of organic binders, and metallic current paths of noble metals such as palladium, silver, gold, which are provided on said foils, together constitute the "green body", and are co-sintered to form a complex three-dimensional composite.

Burning out of the binders and subsequently sintering constitute process steps which are very critical. The organic binder is customarily burned out by heating the green ceramic body very slowly in a low-oxygen atmosphere in furnaces which are specially designed for burning-out binders. Nevertheless, uncontrolled, vigorous combustion of the organic constitutents of the binder may still occur, in particular when the reaction is further accelerated by the catalytic effect of a metallization comprising one of the platinum metals platinum or palladium. Even if the reaction is carried out so slowly that spectacular deflagration cannot occur, the difficultly controllable palladium or platinum-catalysed combustion of the organic binder in an oxygen-containing atmosphere often leads to a deterioration of the bond at the interface between metal and ceramic material, and finally, to delamination of the laminated composite.

These sources of error could be circumvented by burning out the binder in an inert, or even reducing, atmosphere, however, problems would then be caused by the chemistry associated with defects in the oxide-ceramic components. For example, it has been known for a long time that when barium titanate is heated in a reducing, or even inert, atmosphere it emits oxygen and becomes semiconducting:

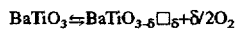

Generally, this reaction is irreversible in multilayer components. Consequently, multilayer components, for example multilayer capacitors of barium-titanate materials, must not be fired in an inert, or even reducing, atmosphere. Once the oxide ceramic has been reduced, an oxidizing post-treatment of the now semiconducting material in the multilayer capacitors is hampered so much by the fact that the electrodes are arranged in a plane at small interspaces that even after a prolonged oxidizing post-treatment at high temperatures above 1200° C., these electrodes would still exhibit too low an insulation resistance.

A further problem arises during heating of palladium-metallized green bodies in an oxidizing atmosphere, because at moderate temperatures the palladium in the electrode layers initially becomes oxidized to a greater or lesser degree. A further increase in temperature causes this oxide to decompose again to the metal and oxygen. The initial oxidation of palladium takes place in a wide temperature range between 450° C. and 600° C., decomposition takes place in a narrow temperature range of 800° C. to 850° C.

Either one of the two reactions causes substantial changes in the volume of the electrode layers, so that also this part of the firing and sintering process constitutes a very critical process step, which may also lead to delamination of the multilayer components. The endothermic decomposition reaction of palladium oxide is particularly critical because it involves a substantial change in volume of approximately 60% in a relatively narrow temperature range.

To solve this problem, it is proposed in Ber. Dt. Keram. Ges. 56 (1979) No. 11–12, 337–341 to avoid the undesirable reactions of palladium by changing the ceramic mass by means of additives in such a way that it can be fired at temperatures below 1145° C., and by cooling the ceramic material in nitrogen after the firing operation has been completed. However, it is not generally possible to so condition the oxide-ceramic dielectric materials used in ceramic electronic components by means of additives that they can be sintered without problems at temperatures below 1145° C., while merely cooling the ceramic material in nitrogen after the firing, process is insufficient.

SUMMARY OF THE INVENTION

It is an object of the invention to provide a method of manufacturing a ceramic, electronic component which is essentially composed of a dielectric oxide ceramic and at least a palladium-containing electrode, by firing and sintering of a green body containing organic binders, with the improving the properties of the component as well as the reliability of the production process.

In accordance with the invention, this object is achieved by a method which is characterized in that the firing process includes a first step in which the binder is removed from the binder-containing green body by a water-gas reaction in a water vapor-containing, essentially oxygen-free, atmosphere at temperatures between 20° and 880° C., and a second step in which the dielectric oxide ceramic is re-oxidized in an atmosphere having an oxygen content of 10 to 100% by volume at a temperature in the range from 880° C. to 900° C.

Such a method has the advantage that, by virtue of the water-gas reaction, the reaction in which the binder is burned out takes place in an endothermic reaction, so that the burn-out reaction occurs slowly in a readily controllable manner. As there is no danger of a sudden, uncontrolled temperature increase due to an explosion-like exothermic binder burn-out, the duration of the firing process can be reduced. The organic constituents of the binder are oxidized completely, without there remaining any carbon agglomerations. Simultaneously, the oxide ceramic is reduced hardly.

if at all. A further aspect of essential importance is that the palladium-containing components are not oxidized either. As a result, the decomposition reaction of palladium oxide at higher temperatures does not take place.

By virtue of the firing process, delaminations at the interface between the palladium-containing metallizing layer and the dielectric ceramic can be minimized.

The method enables the binder burn-out and sintering of the green body to be effected in one and the same furnace which is rapidly heated. By virtue thereof, the process costs can be reduced substantially.

The dielectric properties of components manufactured in accordance with this method are very good because, after the oxidative post-treatment, the oxide-ceramic constitutents are integrally present in the highest oxidation step.

Alternatively, it may be preferred that the water vapor-containing, essentially oxygen-free, atmosphere contains an inert gas. In this case, the partial pressure of the water vapor and hence the reaction rate of the water-gas reaction can be controlled.

In accordance with a preferred embodiment of the invention, nitrogen which is moistened at room temperature is used to carry out the water-gas reaction at a temperature in the range from 400° to 850° C.

It may alternatively be preferred that the water-vapor content in the water vapor-containing, essentially oxygen-free, atmosphere in the temperature range between 200° C. and 880° C. is increased by adding water vapor.

Within the scope of the invention it is preferred that the palladium-containing component also comprises platinum, silver, gold and/or nickel.

It is further preferred that the dielectric oxide ceramic is composed of a simple or substituted titanate or a simple or substituted ferrite.

It is particularly preferred that the dielectric oxide ceramic is composed of barium titanate which is doped predominantly with donors such as niobium, cerium, lanthanum and cobalt, and that the metallic component is composed of a silver-palladium alloy.

These and other aspects of the invention will be apparent from and elucidated with reference to the embodiments described hereinafter.

DESCRIPTION OF THE INVENTION

The method is particularly suitable for ceramic, electronic components which are composed of a laminated composite material of an oxide-ceramic material and one or more planar metallizations. The way in which the laminate is constructed is also found, for example, in electronic components such as printed circuit boards, non-volatile memories, coils, filters such as high-frequency filters, LC filters and EMI filters, varistors, and, in particular, multilayer components such as multilayer capacitors, multilayer varistors and multilayer actuators.

The method can also advantageously be used for the manufacture of cermets (penetrating composite), for example for the manufacture of electrical contacts comprising cermets of silver/palladium-metal-oxide-contact materials containing metal oxides such as $SnO_2$ or ZnO.

The manufacturing process of metallized, oxide-ceramic products comprises the following steps:

1. manufacture of oxide powder,
2. shaping of the oxide ceramic,
3. metallization,
4. furnace process,
5. post-treatment.

These steps will be explained in greater detail by means of the manufacture of multilayer components.

The state-of-the-art multilayer components are composed of a laminated composite of thin, ceramic, dielectric layers between which inner electrodes are interposed. Said inner electrodes are interconnected by external contacts.

Such multilayer electronic components are customarily manufactured by first producing green ceramic substrate foils from the dielectric ceramic material and an organic binder formulation.

Inner electrodes are provided on said substrate foils by coating the green ceramic material with a metallizing paste in accordance with the electrode pattern. Said metallized, green substrate foils are stacked and the stack is laminated to form a semi-finished plate. The semi-finished plates are divided into the desired products. Subsequently, the binder is burned out, whereafter the ceramic material is sintered. Next, the outer electrodes are provided.

The choice of the materials used for the dielectric oxide-ceramic materials of the component depends upon the field of application. Said applications relate, in particular, to capacitive elements in electronic circuits and insulators. Dielectric oxide ceramics having piezoelectric and ferro-electric properties are used for particular fields of application. In general, doped barium titanate is used as the oxide-ceramic material for multilayer capacitors. The ceramic material used for multilayer actuators is generally based on a modified lead titanate-lead zirconate-phase (PZT) having piezoelectric properties; the ceramic material used for multilayer varistors is generally based on doped zinc oxide. For the manufacture of memories, oxide ceramics having favourable ferroelectric properties are required; in general, said oxide ceramics also are PZT phases.

Also ferrites, in particular iron spinels are used in combination with Pd electrodes or AgPd electrodes for the manufacture of multilayer inductors, LC filters, monolithic RCL filters and EMI filters.

Commercially available metallizing pastes can be used as the metallizing agent for the palladium-containing inner electrodes, contacts or conductors paths. Said metallizing pastes comprise the following metallic components: palladium, palladium oxide, silver-palladium alloys or other palladium alloys with silver, gold or platinum. A typical composition is $Ag_{30}Pd_{70}$ for ceramic materials having a high sinter temperature, such as barium-niobium-cobalt perovskites or barium-calcium-zirconium-titanium perovskites, $Ag_{80}Pd_{20}$ for ceramic materials having a low sinter temperature, such as lead-magnesium-niobium perovskites. Alternatively, ternary alloys such as $Pt_xAu_yPd_z$ or $Ag_xAu_yPd_z$, wherein x=0.1–0.6, y=0.1–0.7 and z=0.1–0.7 can be used. The metallizing pastes may additionally comprise other metallic components containing, for example, titanium, zirconium or molybdenum/manganese. In general, organic binders and a solvent also belong to the formulation; occasionally, permanent ceramic binders are also added to said metallizing pastes.

Binder compositions are generally selected in such a way that a high green density and green strength are obtained, the binder can be burned out easily and, finally, a high sintering density is achieved. Typical binder compositions comprise, apart from the actual binder and the solvent, plasticizing agents, liquefiers, wetting agents and/or defoaming agents.

For the solvent use is preferably made of water to which non-aqueous solvents, such as ethanol, butanol, isopropanol, methyl isobutyl ketone and such are added if necessary. For the binders use can be made, for example, of polyvinyl alcohol, polyacrylate esters, methyl cellulose, hydroxyethyl cellulose, polyvinyl butyrale wax and such. For the plasticizers use is made of various phthalate esters, glycols or glycerol. For the liquifiers use can be made of fatty acid esters such as glycerol-tri-oleates or menhaden, and for the wetting agents use can be made, for example, of polyoxyethyl ester.

The furnace process generally comprises four steps: drying, burning out the binder, sintering and cooling. In each of said steps, chemical reactions take place such as desorption of bound water, decomposition of starting compounds for the dielectric oxides, solid-state reactions, reactions leading to liquid phases, and precipitation of crystalline phases.

A separate drying step is generally required only for wet-formed or moist-formed parts; this process step can be omitted for dry-pressed parts. The temperature in this part of the furnace is maximally 95° C. and the furnace atmosphere should exhibit a low content of water vapor, for example moist nitrogen having a water vapor content of 2.5%.

The moistness of the furnace atmosphere should not be too low, however, to preclude drying cracks and premature exsiccation of the outer skin of the parts. If the degree of moistness of the furnace atmosphere ranges from 1 to 5%, the parts to be fired continue to have an "open-pore" surface and hence the humidity can escape from the interior of said parts.

The part of the furnace where the binder is burned out customarily comes directly behind the drying zone. In the part, the water-vapor content of the furnace gas must be at least 4%. The oxygen content of the furnace atmosphere must be carefully reduced to preclude exothermic oxidation of the binder, which could cause an uncontrolled increase of the furnace temperature by several hundred degrees. The exothermic reaction would also lead to the formation of cracks and to fracture in the parts to be sintered. Up to a temperature of 880° C., the atmosphere for the firing process may comprise, in addition to said water vapor, an inert gas, for example a noble gas such as helium, neon, argon, crypton or xenon. The atmosphere may contain nitrogen as the inert gas, and it may additionally comprise CO—$CO_2$ or $CO_2$ to control the velocity of the water-gas reaction. At 750° C., also the last carbon residues ("carbon agglomerations") are burned out.

The end of the water-gas reaction can be determined by means of a $\lambda$ sonde ($O_2$ monitor). If $H_2$ or CO reaction gas is no longer formed, the oxygen partial pressure increases precipitously. This marks the end of the firing phase of the furnace process.

The method in accordance with the invention enables a process-time reducing, more rapid heating in the drying and firing phases constituting a common system.

After the binders have been expulsed completely and have stopped reacting, the parts can be transferred to the post-oxidation zone. In said zone, the furnace atmosphere is changed from inert to oxidizing, i.e. the oxygen partial pressure is increased to at least 20%. In this zone, the temperature curve is kept constant for some time to make sure that the post-oxidation operation is completed before the parts start shrinking in the sintering process. This is important to allow the oxygen to thoroughly penetrate the ceramic material.

In investigations leading to the present invention it has surprisingly been found that in the relatively narrow temperature range between 880° C. and 900° C., oxide-ceramic materials, for example barium-titanate dielectric materials, even if they have been slightly reduced by the hydrogen released in the water-gas reaction, can be re-oxidized by subsequent oxidation in air or another gas mixture having an oxygen content of at least 10% by volume in the temperature range between 880° C. and 900° C.

In this process, a change of the furnace atmosphere from water vapor-containing inert gas to oxygen-containing gas causes the electroceramic oxides to be reconverted to the electrically insulating, dielectric state, without the palladium-containing electrodes being oxidized to PdO. Thus, the risk of delamination as a result of a change in volume of the electrodes in this production step is eliminated.

In the customary state-of-the-art methods, after the binder has been burned out, the very brittle, calcined multilayer components are transferred to a sinter furnace where they are dense-sintered in an oxidizing atmosphere in accordance with an accurately defined temperature curve.

In the method in accordance with the invention, the parts can remain in the same furnace and be subjected to final sintering. The sintering process again starts with a heating phase, whereafter the temperature is increased to the maximum sinter temperature which, dependent upon the product, must be maintained for a specific period of time.

The sinter zone is followed by a cooling zone. The sintered product is cooled by introducing, at the end of the furnace, an accurately determined quantity of air, or another oxygen-containing gas, into said furnace. This pre-heated air can be used to indirectly heat the drying zone.

The entire furnace process can best be carried out in an electrically heated tunnel furnace. The parts of the furnace having different atmospheres are partitioned off by screens or locks.

Viewed in cross-section, the furnace channel should exhibit a uniform furnace atmosphere and temperature distribution. Therefore, the convection rate of the furnace gases should be as low as possible. This also precludes the possible emission of highly volatile oxides from the parts being sintered.

In principle, the process can alternatively be carried out in a single-chamber furnace or multi-chamber furnace instead of a tunnel furnace, however, the exchange of the furnace gases would involve higher energy losses.

During the furnace process, the organic constituents in the binder react at temperatures above approximately 400° C. with the water vapor in the so-called "water-gas reaction":

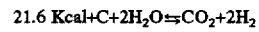
$$21.6 \text{ Kcal} + C + 2H_2O \rightleftharpoons CO_2 + 2H_2$$

By means of this reaction, carbon or carbon hydrogens will generally be converted at higher temperatures to carbon dioxide and hydrogen as a result of the action of water vapour.

If the organic binder is burned out of a green body in a water vapour-containing atmosphere instead of air or a low-oxygen oxygen/nitrogen mixture, the water-gas reaction causes the organic binder to be completely removed, without the palladium content of the electrodes being applied by oxidation.

The water vapour-containing atmosphere can be obtained by filling the furnace exclusively with water vapour. Alternatively, water vapour can be added at room temperature to the inert gas. When the technically customary inert gases, such as nitrogen and argon, are used only a low water-vapour partial pressure, i.e. of the order of several hundred millibar, can be attained.

To attain higher partial pressures, it is alternatively possible to introduce the water vapour in furnace sections having temperatures above the boiling point of water.

EXEMPLARY EMBODIMENT

Multilayer capacitors are manufactured from a dielectric material on the basis of $BaTiO_3$ to which $Nb_2O_5$ and $Co_3O_4$ are added. These ceramic oxide powders can be obtained from TAM Ceramics Inc. Niagarafalls, USA. The dielectric material meets the X7R standard.

The formulation comprises 43.14 wt. % of the above-mentioned ceramic powder, 0.13 wt. % of a wetting agent, 1.37 wt. % of a plasticizer, 34.51 wt. % of a solvent, 20.54 wt. % of a binder and 0.01 wt. % of a chelate-forming agent. Sorbitan monoloureate (Atlas Chemical) is used as the wetting agent, butyl benzyl phthalate (Monsanto) is used as the plasticizer, trichloroethylene is used as the solvent, and a mixture of 90% ethyl methacrylate and 10% methyl methacrylate (Rhöm & Haas) in the form of a 30% solution in methyl ethyl ketone is used as the binder.

The batch size is 50–100l, the charge is ground in a ball mill for 5–8 h.

The screen-printing paste of the electrodes comprises a mixture of Pd/PdO=1:1 with ethyl cellulose as the binder and diethylene glycol monobutyl ethylacetate as the solvent.

The green multilayer capacitors are manufactured in the customary manner. The ceramic powder and the binder are mixed to form a slurry. Said slurry is cast into foils which, after drying, are printed with the screen-printing paste for the electrodes and then stacked. Said stacks are pressed, whereafter the green capacitors are punched.

The green multilayer capacitors thus manufactured are composed of 50 dielectric layers and 51 screen-printed electrodes as well as 2 covering layers which are each composed of 5 individual layers. The thickness of a dielectric layer in the green state is 40 to 50 μm, the thickness of a green, screen-printed electrode layer of a palladium paste is approximately 4 μm. The weight of an individual green multilayer capacitor is approximately 22 mg.

The firing process is carried out in a closed furnace in an atmosphere of water vapour and nitrogen. The nitrogen had a residual oxygen content of <5 ppm. The nitrogen is mixed with the water vapour in the ratio of 30:1. The flow rate is approximately 100 ml/min.

The heating rate of the furnace is approximately 1° C./min, the maximum temperature is 880° C. The weight loss after the burn-out process is approximately 10%. After the binder has been burned out, the calcined capacitors already have a density of 57–60% of the theoretical density.

Immediately after the binder has been burned out, the capacitors are sintered in air in the same furnace. The atmosphere in the furnace is changed from water vapour/nitrogen to air and the temperature is maintained at 880° C. for 30 minutes. The flow rate of air again was approximately 100 ml/min. The furnace was heated to a final temperature of 1300° C. at a heating rate of 5° C./min, and after the latter temperature had been maintained for 2 hours, the furnace was cooled down at the same rate. The density of the multilayer capacitors thus fired and sintered is 96–98% of the theoretical density.

Characterization of the capacitors.

The capacitors in accordance with the invention, which were fired in water vapour/nitrogen and, from 880° C., in air were subjected to microscopic examinations which did not reveal any signs of delamination. The measured values for the capacitance, dielectric loss and insulation resistance showed that the oxide-ceramic component was completely oxidized.

To determine the carbon residue ($CO_2$), the fired ceramic material was broken, ground and baked in an oxygen flow. No carbon at all could be detected.

We claim:

1. A method of manufacturing a ceramic electronic component, which is comprised of a dielectric oxide ceramic component that is comprised of a material selected from the group consisting of a simple titanate, a substituted titanate, a simple ferrite and a substituted ferrite, and at least one palladium-containing, component, by firing and sintering of a green body comprising organic binder and the dielectric oxide ceramic characterized in that the firing process includes a first step in which the binder is removed from said binder-containing green body by a water-gas reaction in a water vapor-containing, essentially oxygen-free, atmosphere at temperatures between 20° and 880° C., and a second step in which the dielectric oxide ceramic is re-oxidized in an atmosphere having an oxygen content of 10 to 100% by volume at a temperature in the range from 880° C. to 900° C.

2. A method of manufacturing a ceramic electronic component as claimed in claim 1, characterized in that the water vapor-containing, essentially oxygen-free, atmosphere contains an inert gas.

3. A method of manufacturing a ceramic electronic component as claimed in claim 2, characterized in that nitrogen which is moistened at room temperature is used to carry out the water-gas reaction at a reaction temperature in the range from 400° C. to 850° C.

4. A method of manufacturing a ceramic electronic component as claimed in claim 2, characterized in that the water-vapor content in the water vapor-containing, essentially oxygen-free, atmosphere in the temperature range between 200° C. and 800° C. is increased by adding water vapor.

5. A method of manufacturing a ceramic electronic component as claimed in claim 1, characterized in that the palladium-containing component also comprises platinum, silver, gold and/or nickel.

6. A method of manufacturing a ceramic electronic component as claimed in claim 1, characterized in that the dielectric oxide ceramic is composed of a barium titanate doped with niobium and cobalt, and the palladium-containing component is composed of a silver-palladium alloy.

7. A method of manufacturing a ceramic electronic component as claimed in claim 1, characterized in that nitrogen which is moistened at room temperature is used to carry out the water-gas reaction at a reaction temperature in the range from 400° C. to 850° C.

8. A method of manufacturing a ceramic electronic component as claimed in claim 1, characterized in that the water-vapor content in the water vapor containing, essentially Oxygen-free, atmosphere in the temperature range between 200° C. and 800° C. is increased by adding water vapor.

* * * * *